(12) United States Patent
Wang

(10) Patent No.: US 8,093,755 B2
(45) Date of Patent: Jan. 10, 2012

(54) UNINTERRUPTIBLE POWER SUPPLY WITH WIRELESS COMMUNICATION OF DETECTED DATA

(75) Inventor: Hsiung-Jheng Wang, Taipei County (TW)

(73) Assignee: Chi Mei Communication Systems, Inc., Tu-Cheng, New Taipei (TW)

( * ) Notice: Subject to any disclaimer, the term of this patent is extended or adjusted under 35 U.S.C. 154(b) by 385 days.

(21) Appl. No.: 12/407,155

(22) Filed: Mar. 19, 2009

(65) Prior Publication Data

US 2010/0096929 A1 Apr. 22, 2010

(30) Foreign Application Priority Data

Oct. 20, 2008 (CN) .......................... 2008 1 0305016

(51) Int. Cl.
*H02J 9/00* (2006.01)
(52) U.S. Cl. ........................................................ 307/64
(58) Field of Classification Search ...................... 307/64
See application file for complete search history.

(56) References Cited

U.S. PATENT DOCUMENTS

| 5,612,580 | A * | 3/1997 | Janonis et al. ................... 307/64 |
| 6,201,319 | B1 * | 3/2001 | Simonelli et al. ............... 307/26 |
| 6,691,248 | B1 * | 2/2004 | Nishijima et al. ............... 714/14 |
| 6,735,704 | B1 * | 5/2004 | Butka et al. .................... 713/300 |
| 6,854,065 | B2 * | 2/2005 | Smith et al. .................... 713/300 |
| 6,906,435 | B1 * | 6/2005 | Lin et al. .......................... 307/66 |
| 7,265,458 | B2 * | 9/2007 | Edelen et al. .................... 307/65 |
| 7,330,990 | B2 * | 2/2008 | Sato et al. ...................... 713/340 |
| 7,358,620 | B2 * | 4/2008 | Melfi ............................. 290/1 A |
| 7,444,208 | B2 * | 10/2008 | Kadoi et al. .................. 700/286 |
| 7,456,518 | B2 * | 11/2008 | Hjort et al. ...................... 307/64 |
| 7,737,580 | B2 * | 6/2010 | Hjort et al. ...................... 307/65 |
| 7,939,968 | B2 * | 5/2011 | Hjort et al. ...................... 307/66 |
| 2005/0225914 | A1 * | 10/2005 | King ............................... 361/62 |
| 2006/0072283 | A1 * | 4/2006 | Thompson et al. ........... 361/600 |
| 2009/0009001 | A1 * | 1/2009 | Marwali et al. ................. 307/65 |
| 2009/0102618 | A1 * | 4/2009 | Iwai ......................... 340/310.11 |
| 2010/0001868 | A1 * | 1/2010 | Liao ............................. 340/635 |

* cited by examiner

*Primary Examiner* — Jared Fureman
*Assistant Examiner* — Adi Amrany
(74) *Attorney, Agent, or Firm* — Altis Law Group, Inc.

(57) ABSTRACT

A power supply system includes a power supply device, a switch device, a detecting device and a wireless operating terminal. The power supply device is connected to an electric appliance via the switch device to supply electric power to the electric appliance. The detecting device is connected to the switch device to detect working electric potential of the power supply device and the electric appliance, thereby generating and recording detecting data of the power supply device and the electric appliance. The wireless operating terminal communicates with the detecting device for remotely receiving the detecting data from the detecting device.

15 Claims, 2 Drawing Sheets

UNINTERRUPTIBLE POWER SUPPLY WITH WIRELESS COMMUNICATION OF DETECTED DATA

BACKGROUND

1. Field of the Invention

The present invention relates to power supply systems, and particularly to a power supply system with wireless detection.

2. Description of Related Art

Power supply systems often require detecting devices for detecting their working status. Since power supply systems usually have very high (for example, 220V, 380V or more) working potentials, protecting apparatuses are widely used in the power supply systems to prevent high working potentials damaging the detecting devices. Most conventional protecting apparatuses are heavy and large in size, which may increase the size and weight of detecting devices, resulting in difficulties when assembling and conveying the detecting devices.

Therefore, in use, a detecting device of a power supply system is usually fixedly disposed at a predetermined position and connected by cables to the power supply system and manipulators (for example, operators or automatic processors). When the power supply system works, detection data of the power supply is recorded by the detecting device and transferred to manipulators by the cables. However, these cables may limit positions of the manipulators and increase cost.

Therefore, there is room for improvement within the art.

BRIEF DESCRIPTION OF THE DRAWINGS

Many aspects of the present power supply system can be better understood with reference to the following drawings. The components in the various drawings are not necessarily drawn to scale, the emphasis instead being placed upon clearly illustrating the principles of the present power supply system. Moreover, in the drawings, like reference numerals designate corresponding parts throughout the figures.

DETAILED DESCRIPTION OF THE EXEMPLARY EMBODIMENT

Figure 1:
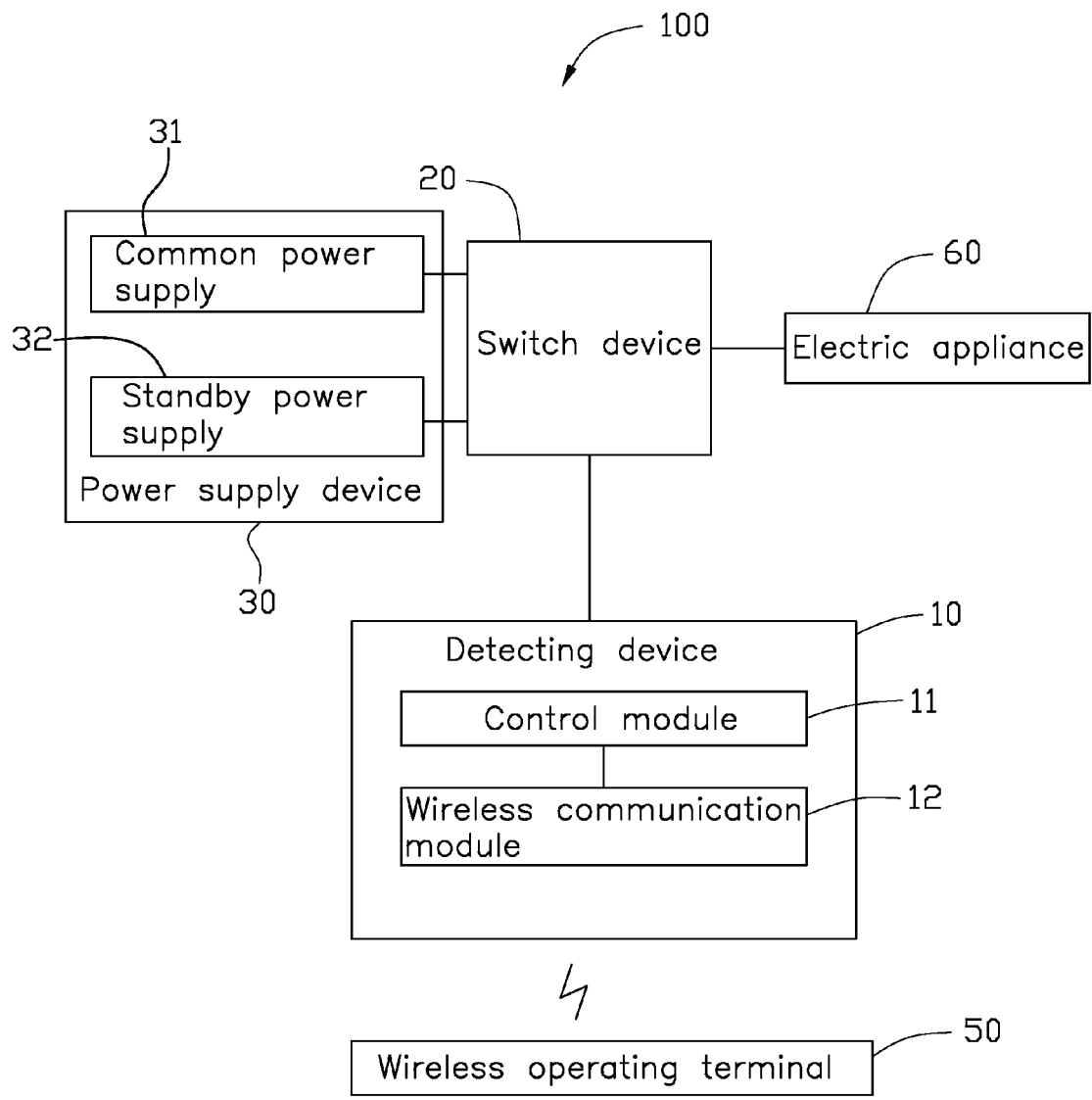
FIG. 1 is a diagram of a power supply system, according to an exemplary embodiment.

Referring to FIG. 1, a power supply system 100 according to an exemplary embodiment is provided. The power supply system 100 includes a detecting device 10, a switch device 20, a power supply device 30 and a wireless operating terminal 50. The power supply device 30 includes a common power supply 31 and a standby power supply 32, which are both connected to the switch device 20. The switch device 20 is connected to at least one electric appliance 60 and can selectively switch on either one of the common power supply 31 and a standby power supply 32 to supply electric power to the electric appliance 60. The detecting device 10 is connected to the switch device 20 and detects the working status of the power supply device 30 and the electric appliance 60 through the switch device 20. The wireless operating terminal 50 can communicate with the detecting device 10 by conventional communication networks such as mobile phone networks, thereby obtaining detecting data of the power supply device 30 and the electric appliance 60, and controlling the detecting device 10.

Figure 2:
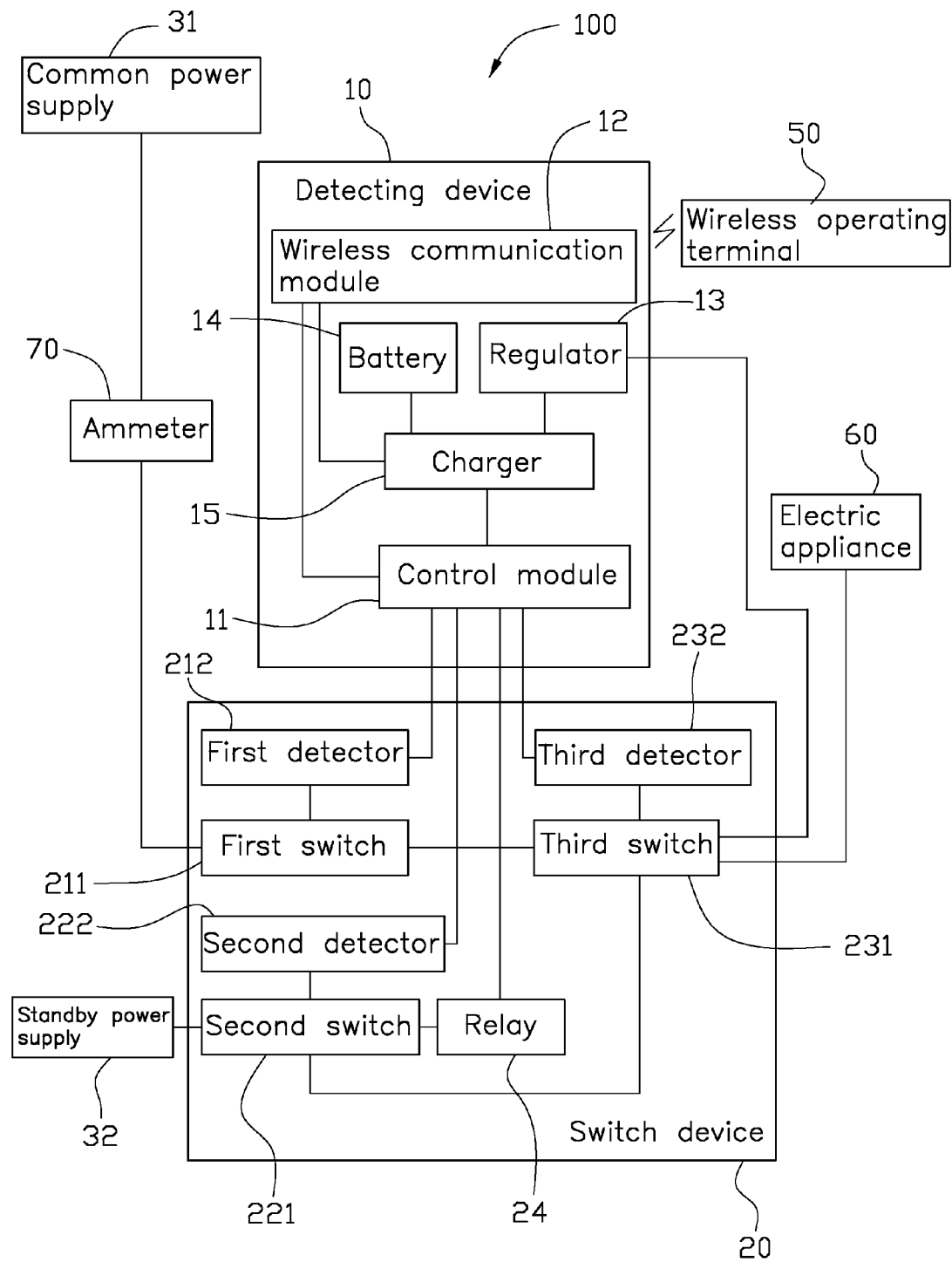
FIG. 2 is a particular diagram of the power supply system shown in FIG. 1.

Also referring to FIG. 2, the detecting device 10 includes a control module 11, a wireless communication module 12 connected to the control module 11, a regulator 13, a battery 14 and a charger 15. The control module 11 can be a conventional data processor, such as a computer, a single chip or a microprocessor, etc. The wireless communication module 12 can be a conventional transceiver such as an antenna, which is connected to the control module 11 and can communicate with the wireless operating terminal 50. The charger 15 is connected to the control module 11 and the wireless communication module 12. The regulator 13 and the battery 14 are both connected to the charger 15.

The switch device 20 includes a first switch 211, a second switch 221 and a third switch 231. The first switch 211 and the second switch 221 are both connected to the third switch 231. The common power supply 31 is connected to the first switch 211, the standby power supply 32 is connected to the second switch 221, and the electric appliance 60 is connected to the third switch 231.

The switch device 20 further includes a first detector 212 connected to the first switch 211, a second detector 222 connected to the second switch 221, a third detector 232 connected to the third switch 231 and a relay 24. The detectors 212, 222, 232 are all detecting circuits made of MID400 chip, which can generate relatively low porenitals (i.e., no more than 2V) for use as detecting data when relatively higher working electric potentials (e.g., 110V, 220V, 380V) are supplied to the switches 211, 221, 231. The detectors 212, 222, 232 are also connected to the control module 11. The second switch 221 is connected to the control module 11 through the relay 24, thus the control module 11 can turn on or turn off the second switch 221 by the relay 24. The third switch 231 is connected to the regulator 13.

The wireless operating terminal 50 can be a portable terminal or an immobile terminal installed at a predetermined position. The wireless operating terminal 50 can receive and send wireless electronic signals, display data, and edit instruction for controlling the power supply system 100. As examples, the wireless operating terminal 50 can be a mobile phone, a personal digital assistant (PDA), a laptop computer, etc.

When the power supply system 100 is started, the first switch 211 and the third switch 231 are turned on and then the common power supply 31 supplies electric power to the electric appliance 60. During use of the appliance 60, the first detector 212 and the third detector 232 respectively detect real time working electric potential of the first switch 211 and the third switch 231, and generate relative low detecting output electric potentials according to the working electric potentials. The voltages of the detecting output potentials are sent to the control module 11 to be recorded as detecting data of the common power supply 31 and the electric appliance 60. The control module 11 determines if the working electric potentials are in acceptable ranges according to the detecting data, and can send the detecting data to the wireless operating terminal 50 using the wireless communication module 12. Thus, manipulators (operators or processors) can obtain real time detecting data from the wireless operating terminal 50.

If the common power supply 31 malfunctions, the control module 11 can detect the malfunctions of the common power supply 31 according to the detecting data generated by the first detector 212. Thus, the control module 11 automatically turns on the second switch 221 by the relay 24 such that the standby power supply 32 replaces the common power supply 31 to supply electric power to the electric appliance 60 through the second switch 221 and the third switch 231. The second detector 222 detects real time working electric potential of the second switch 221, thereby generating detecting data of the standby power supply 32 and sending the detecting data to the control module 11 to record. The control module 11 also sends the detecting data to the wireless operating terminal 50. When the common power supply 31 is repaired, the control module 11 detects the restored electric potential of the common power supply 31 and the first switch 211 by the first detector 211. The control module 11 automatically turns off the second switch 221 by the relay 24, and the common power supply 31 resumes to supply electric power to the electric appliance 60. Additionally, if the standby power supply 32 also malfunctions, the control module 11 can detect the error according to the detecting data generated by the second detector 222, thus the control module 11 can automatically turn off the second switch 221 until the common power supply 31 or the standby power supply 32 is repaired.

The control module 11 can also be connected to the first switch 211 and the third switch 231 using relays (not shown), thus the control module 11 can automatically turn on or turn off the first switch 211 and the third switch 231. Further, the manipulators can edit instruction by the wireless operating terminal 50 and send the instruction to the control module 11 by the wireless operating terminal 50 and the wireless communication module 12, thereby controlling the switches 211/221/231 via the control module 11. Thus, the power supply system 100 can be manually remotely operated. An ammeter 70 can also be connected between the common power supply 31 and the first switch 211 to directly display the common working electric potential of the power supply system 100.

During use, power for operating the control module 11 and the wireless communication module 12 can be supplied by the charger 15 and the battery 14. The working electric potential supplied by the common power supply 31 or the standby power supply 32 can also be outputted from the third switch 231 to the regulator 13 to be regulated into an acceptable range to be used by the control module 11 and the wireless communication module 12, and then is supplied to the control module 11 and the wireless communication module 12 through the charger 15.

In the exemplary power supply system 100, the detecting data can be sent to the wireless operating terminal 50 by typical communication networks, thus, the manipulators can monitor the data anytime and anywhere via the wireless communication terminal 50. The manipulators can further remotely control the power supply system 100 using the wireless communication terminal 50. Additionally, the power supply system 100 can automatically switch and detect the two power supplies (31 and 32) in a working process, such that the electric appliance connected thereto gets durative electric power.

It is to be further understood that even though numerous characteristics and advantages of the present embodiments have been set forth in the foregoing description, together with details of structures and functions of various embodiments, the disclosure is illustrative only, and changes may be made in detail, especially in matters of shape, size, and arrangement of parts within the principles of the present invention to the full extent indicated by the broad general meaning of the terms in which the appended claims are expressed.

What is claimed is:

1. A power supply system for an electric appliance, comprising:
   a power supply device including a common power supply and a standby power supply;
   a switch device, the power supply device being connected to the electric appliance by the switch device to supply electric power to the electric appliance, wherein both the common power supply and the standby power supply are connected to the switch device to selectively supply electric power to the electric appliance;
   a detecting device connected to the switch device to detect working electric potential of the power supply device and the electric appliance, and generating and recording detecting data of the power supply device and the electric appliance; the detecting device including a control module, a wireless communication module, a battery, and a charger connected to the control module, the wireless communication module, and the battery; the battery supplying electric power to the control module and the wireless communication module through the charger; the control module recording the detecting data and determining if the working electric potentials of the common power supply, the stand power supply and the electric appliance are in acceptable ranges according to the detecting data; and
   a wireless operating terminal communicating with the detecting device for remotely receiving the detecting data from the detecting device, the wireless communication module communicating with the wireless operating terminal for sending the detecting data to the wireless operating terminal and receiving instructions from the wireless operating terminal.

2. The power supply as claimed in claim 1, wherein the switch device includes a first switch connected to the common power supply, a second switch connected to the standby power supply and a third switch connected to the first switch, the second switch and the electric appliance.

3. The power supply system as claimed in claim 2, wherein the switch device further includes a first detector connected to the first switch, a second detector connected to the second switch and a third detector connected to the third switch, the first detector, the second detector, and the third detector detecting the working electric potentials of the first switch, the second switch and the third switch, respectively and generating the detecting data of the common power supply, the stand power supply and the electric appliance, respectively.

4. The power supply system as claimed in claim 3, wherein the control module is connected to the first detector, the second detector and the third detector to record the detecting data and determine if the working electric potentials of the common power supply, the standby power supply and the electric appliance are in acceptable ranges according to the detecting data.

5. The power supply system as claimed in claim 4, wherein the switch device further includes a relay connected between the control module and the second switch, and the control module controls the standby power supply to replace the common power supply to supply electric power to the electric appliance via the relay and the second switch.

6. The power supply system as claimed in claim 4, wherein the detecting device further includes a regulator connected to the switch device, the power supply device supplies electric power to the control module and the wireless communication module via the switch device, the regulator and the charger.

7. A power supply system for supplying electric power to an electric appliance, comprising:
   a power supply device including a common power supply and a standby power supply;
   a switch device, the common power supply and the standby power supply being selectively connected to the electric appliance by the switch device;
   a plurality of detectors respectively connected to the common power supply, the standby power supply and the electric appliance to detect the electric potentials thereof and generating detecting data according to the electric potentials;

a control module connected to the connectors to record the detecting data and determine if the electric potentials of the common power supply, the stand power supply and the electric appliance are in acceptable ranges according to the detecting data;

a wireless communication module connected to the control module;

a charger connected to the control module and the wireless communication module;

a battery connected to the charger to supply electric power to the control module and the wireless communication module through the charger; and a wireless operating terminal communicating with the detecting device for remotely receiving the detecting data from the wireless communication module.

8. The power supply as claimed in claim 7, wherein the switch device includes a first switch connected to the common power supply, a second switch connected to the standby power supply and a third switch connected to the first switch, the second switch and the electric appliance.

9. The power supply system as claimed in claim 8, wherein the switch device includes a first detector connected to the first switch, a second detector connected to the second switch and a third detector connected to the third switch to respectively detect working electric potentials of the first switch, the second switch and the third switch and generate detecting data of the common power supply, the stand power supply and the electric appliance.

10. The power supply system as claimed in claim 9, wherein the switch device further includes a relay connected between the control module and the second switch, and the control module controls the standby power supply to replace the common power supply to supply electric power to the electric appliance by the relay and the second switch.

11. A power supply system for supplying electric power to an electric appliance, comprising:

a power supply device including a common power supply and a standby power supply;

a switch device, the common power supply and the standby power supply being selectively connected to the electric appliance by the switch device, the switch device detecting working electric potentials of the power supply device and the electric appliance;

a detecting device connected to the switch device for generating and recording detecting data of the power supply device and the electric appliance according to the working electric potentials of the power supply device and the electric appliance detected by the switch device, the detecting device including a control module, a wireless communication module, a battery, and a charger connected to the control module, the wireless communication module, and the battery; the battery supplying electric power to the control module and the wireless communication module through the charger; the control module recording the detecting data and determining if the working electric potentials of the common power supply, the stand power supply and the electric appliance are in acceptable ranges according to the detecting data; and a wireless operating terminal communicating with the detecting device to remotely receive the detecting data from the detecting device and send instruction to the detecting device, thereby controlling the switch device to selectively connect the common power supply and the standby power supply to the electric appliance to supply electric power; the wireless communication module communicating with the wireless operating terminal for sending the detecting data to the wireless operating terminal and receiving the instruction from the wireless operating terminal.

12. The power supply as claimed in claim 11, wherein the switch device includes a first switch connected to the common power supply, a second switch connected to the standby power supply and a third switch connected to the first switch, the second switch and the electric appliance.

13. The power supply system as claimed in claim 12, wherein the switch device further includes a first detector connected to the first switch, a second detector connected to the second switch and a third detector connected to the third switch to respectively detect working electric potentials of the first switch, the second switch and the third switch and generate detecting data of the common power supply, the stand power supply and the electric appliance.

14. The power supply system as claimed in claim 13, wherein the switch device further includes a relay connected between the control module and the second switch, and the control module controls the standby power supply to replace the common power supply to supply electric power to the electric appliance by the relay and the second switch.

15. The power supply as claimed in claim 14, wherein the control module controls the relay and the second switch according to the instruction sent from the wireless operating terminal.

* * * * *